US011295127B2

(12) United States Patent
Yoshikawa et al.

(10) Patent No.: US 11,295,127 B2
(45) Date of Patent: Apr. 5, 2022

(54) ELECTRONIC DEVICE, INFORMATION PROCESSING METHOD, AND PROGRAM

(71) Applicant: SONY CORPORATION, Tokyo (JP)

(72) Inventors: Kiyoshi Yoshikawa, Saitama (JP); Masayuki Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 15/855,444

(22) Filed: Dec. 27, 2017

(65) Prior Publication Data

US 2018/0218212 A1   Aug. 2, 2018

(30) Foreign Application Priority Data

Jan. 31, 2017 (JP) .............................. JP2017-015635

(51) Int. Cl.
*G06K 9/00* (2006.01)
*G06F 21/32* (2013.01)

(52) U.S. Cl.
CPC ......... *G06K 9/00604* (2013.01); *G06F 21/32* (2013.01); *G06K 9/0061* (2013.01); *G06K 9/00912* (2013.01)

(58) Field of Classification Search
CPC ............. G06K 9/00604; G06K 9/0061; G06K 9/00912; G06F 21/32
See application file for complete search history.

(56) References Cited

U.S. PATENT DOCUMENTS

| 2006/0029262 | A1* | 2/2006 | Fujimatsu | ................ G07C 9/37 382/117 |
| 2011/0012711 | A1* | 1/2011 | Abe | ................ G06Q 20/40145 340/5.82 |
| 2011/0286023 | A1* | 11/2011 | Hagisawa | ............... G06K 9/346 358/1.13 |
| 2012/0249297 | A1 | 10/2012 | Du et al. | |
| 2012/0308089 | A1 | 12/2012 | Lee | |
| 2014/0126782 | A1* | 5/2014 | Takai | .................. G06F 3/04842 382/116 |
| 2015/0254508 | A1* | 9/2015 | Kimura | .............. G06K 9/00604 382/117 |
| 2016/0234092 | A1* | 8/2016 | Avery | ..................... H04L 43/16 |
| 2017/0017842 | A1 | 1/2017 | Ma et al. | |

FOREIGN PATENT DOCUMENTS

| JP | 2000-259817 A | 9/2000 |
| JP | 2003-308523 A | 10/2003 |
| JP | 2005-167716 A | 6/2005 |
| JP | 2005-244549 A | 9/2005 |
| JP | 2006-201920 A | 8/2006 |
| JP | 2007-257040 A | 10/2007 |
| JP | 2008-033681 A | 2/2008 |

(Continued)

*Primary Examiner* — John W Lee
(74) *Attorney, Agent, or Firm* — Paratus Law Group, PLLC

(57) ABSTRACT

Provided is an electronic device including: a determination unit configured to determine, on a basis of information regarding an environment for acquiring biological information for use in biometric authentication regarding an eye, a method of realizing an environment for acquiring biological information suitable for the biometric authentication; and a control unit configured to perform control corresponding to the method.

20 Claims, 12 Drawing Sheets

(56) References Cited

FOREIGN PATENT DOCUMENTS

| | | | |
|---|---|---|---|
| JP | 2008-264341 | A | 11/2008 |
| JP | 2009-211370 | A | 9/2009 |
| JP | 2012-065311 | A | 3/2012 |
| JP | 2015-170099 | A | 9/2015 |
| WO | WO 2016/090376 | A1 | 6/2016 |

* cited by examiner

ELECTRONIC DEVICE, INFORMATION PROCESSING METHOD, AND PROGRAM

CROSS REFERENCE TO RELATED APPLICATIONS

This application claims the benefit of Japanese Priority Patent Application JP 2017-015635 filed Jan. 31, 2017, the entire contents of which are incorporated herein by reference.

BACKGROUND

The present disclosure relates to an electronic device, an information processing method, and a program.

In recent years, a biometric authentication technology is utilized for various devices, systems, or the like. For example, JP 2007-257040A discloses a technology that notifies a user of a cause of a failure in a case where biometric authentication fails.

SUMMARY

However, in an existing technology such as JP 2007-257040A, it is difficult to acquire biological information suitable for biometric authentication in some cases. For example, in JP 2007-257040A, in a case where biometric authentication fails, the user can recognize a cause of the failure on the basis of a notification from a device. However, the user has to consider a method of removing the cause by himself/herself. Biometric authentication fails for various causes. For example, there are a plurality of causes of the failure, a method for removing a cause of the failure is complicated, or a cause of the failure cannot be removed only by an action of the user.

The present disclosure has been made in view of the above circumstances, and the present disclosure provides an electronic device, an information processing method, and a program, each of which is new, is improved, and is capable of acquiring biological information more suitable for biometric authentication regarding an eye.

According to an embodiment of the present disclosure, there is provided an electronic device including: a determination unit configured to determine, on a basis of information regarding an environment for acquiring biological information for use in biometric authentication regarding an eye, a method of realizing an environment for acquiring biological information suitable for the biometric authentication; and a control unit configured to perform control corresponding to the method.

In addition, according to an embodiment of the present disclosure, there is provided an information processing method that is executed by a computer, the information processing method including: determining, on a basis of information regarding an environment for acquiring biological information for use in biometric authentication regarding an eye, a method of realizing an environment for acquiring biological information suitable for the biometric authentication; and performing control corresponding to the method.

In addition, according to an embodiment of the present disclosure, there is provided a program for causing a computer to realize determining, on a basis of information regarding an environment for acquiring biological information for use in biometric authentication regarding an eye, a method of realizing an environment for acquiring biological information suitable for the biometric authentication, and performing control corresponding to the method.

As described above, according to the embodiments of the present disclosure, it is possible to acquire biological information more suitable for biometric authentication regarding an eye.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
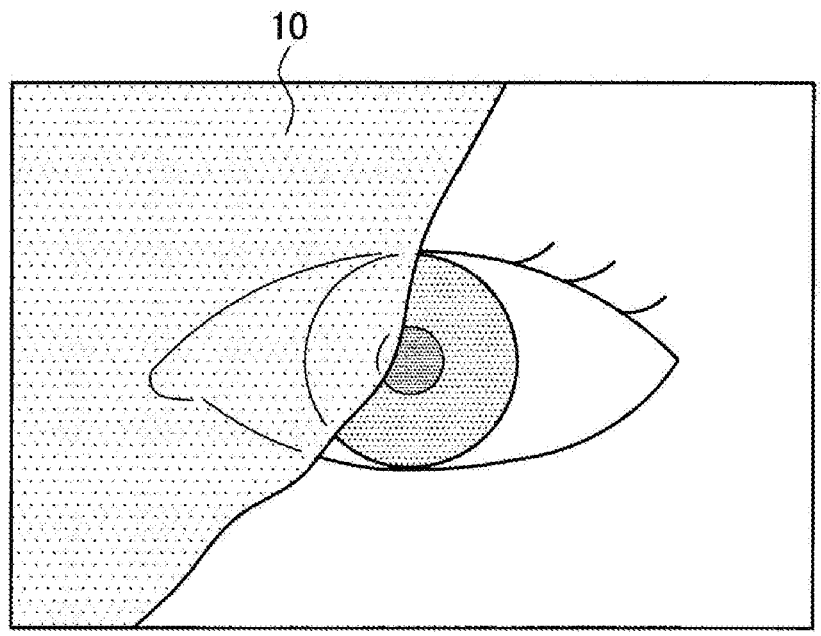
FIG. 1 is a diagram illustrating an example of a cause why a favorable iris is not acquired.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Background
2. Outline of present disclosure
3. Specific examples of present disclosure
4. Functional configuration of device 5. Operation of device
6. Hardware configuration
7. Remarks
8. Conclusion <1. Background>

First, a background of the present disclosure will be described.

As described above, the present disclosure is a technology relating to biometric authentication regarding an eye. For example, the present disclosure can be applied to various kinds of biometric authentication regarding an eye, such as iris authentication, retina authentication, authentication based on a pattern of a change in a pupil diameter, and authentication based on a line of sight. Note that the above biometric authentication is merely examples, and the kind of biometric authentication is not limited. In the present specification, a case where the present disclosure is utilized for iris authentication will be described as an example.

Iris authentication is performed on the basis of a pattern of a design that an iris has. In addition, the pattern is inherent to each individual and is hardly changed over time and can therefore be used to identify (authenticate) the individual.

Iris authentication can be realized by various methods. As an example, an iris region is extracted from a captured image in which an image of an eye is captured and a feature value of the iris is calculated by using a predetermined algorithm. Then, authentication is performed by comparing the calculated feature value with a feature value of an iris of a user acquired in advance.

Herein, an iris suitable for iris authentication is not acquired because of various factors, such as a state of a target user of iris authentication and a state of a surrounding environment of the target user, and iris authentication fails in some cases. Examples of a cause why a favorable iris is not acquired will be described with reference to FIGS. 1 to 6. FIGS. 1 to 6 are views illustrating examples of a cause why a favorable iris is not acquired.

FIG. 1 is a diagram illustrating an example where blown-out highlights are generated in a captured image and a favorable iris is not acquired because image capturing processing of an eye is performed in direct sunlight. More specifically, as illustrated in FIG. 1, iris authentication fails in some cases because blown-out highlights 10 are generated in a part of an area of the captured image and an image of a part of an iris region is not appropriately captured.

Figure 2:
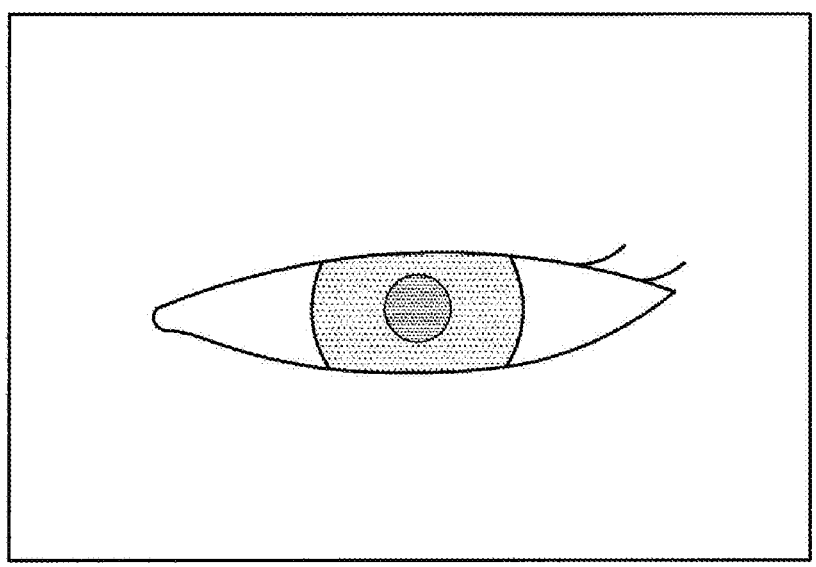
FIG. 2 is a diagram illustrating an example of a cause why a favorable iris is not acquired.

FIG. 2 is a diagram illustrating an example where a favorable iris is not acquired because the eye is not satisfactorily opened. More specifically, as illustrated in FIG. 2, an exposed iris region is small because the user blinks, the eye of the user is narrow, or other reasons, and therefore iris authentication fails in some cases.

Figure 3:
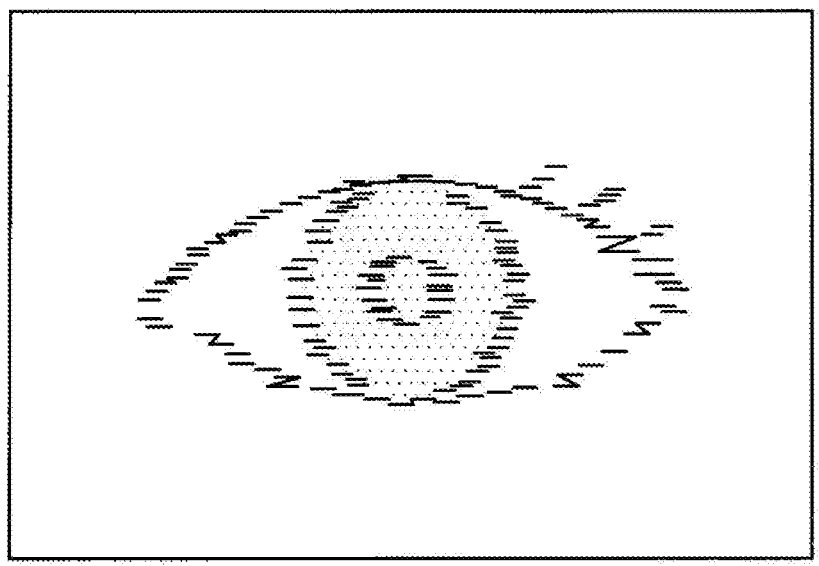
FIG. 3 is a diagram illustrating an example of a cause why a favorable iris is not acquired.

FIG. 3 is a diagram illustrating an example where a favorable iris is not acquired because of a blur of the iris region. More specifically, as illustrated in FIG. 3, the iris region is blurred in a captured image because, for example, the user or an image capturing unit (camera) moves at a time when an image of the eve is captured, and therefore iris authentication fails in some cases.

Figure 4:
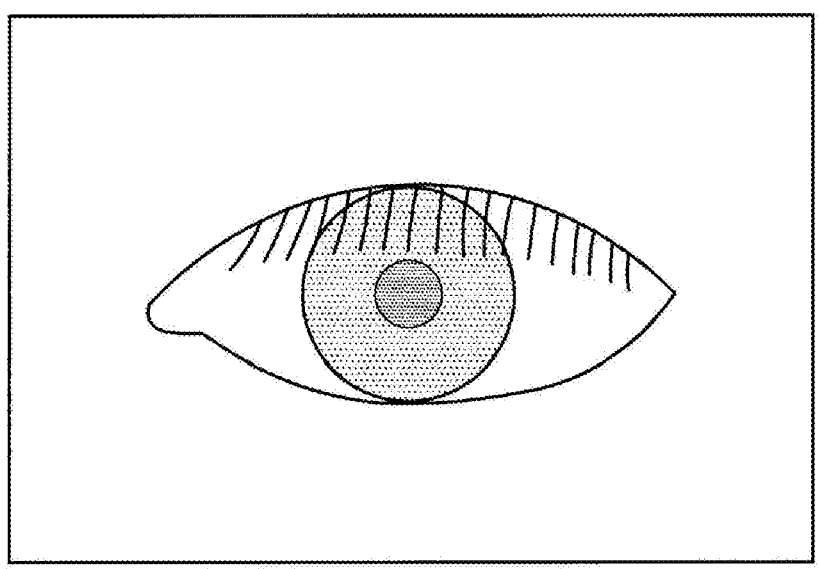
FIG. 4 is a diagram illustrating an example of a cause why a favorable iris is not acquired.

FIG. 4 is a diagram illustrating an example where a favorable iris is not acquired because of an obstruction such as eyelashes. More specifically, as illustrated in FIG. 4, for example, a part of the iris region is covered by eyelashes or the like in a captured image because the eyelashes or the like are located between the eye and the image capturing unit (camera), and therefore iris authentication fails in some cases.

Figure 5:
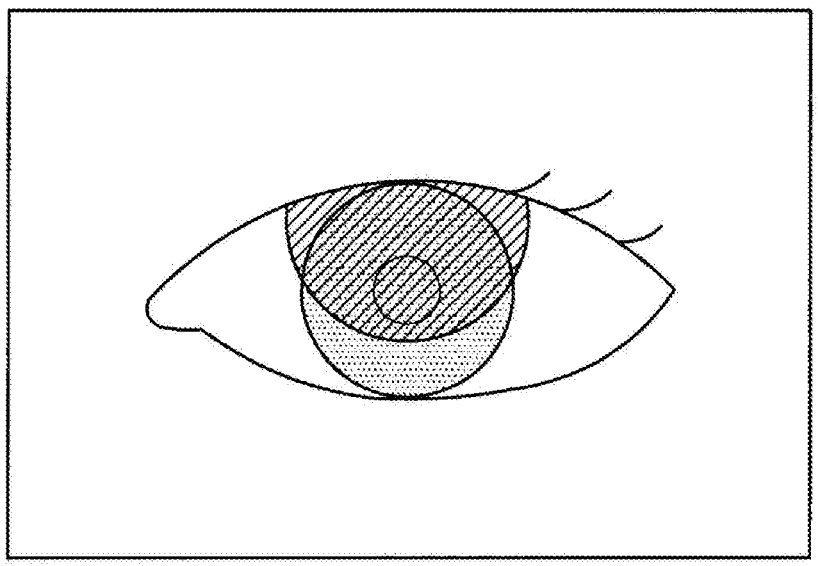
FIG. 5 is a diagram illustrating an example of a cause why a favorable iris is not acquired.

FIG. 5 is a diagram illustrating an example where a favorable iris is not acquired because a contact lens is shifted. In a case where the user wears a colorless contact lens, a favorable iris is acquired unless the contact lens is shifted, and therefore iris authentication is appropriately performed. However, as illustrated in FIG. 5, when the contact lens is shifted, a favorable iris is not acquired and iris authentication fails in some cases.

Figure 6:
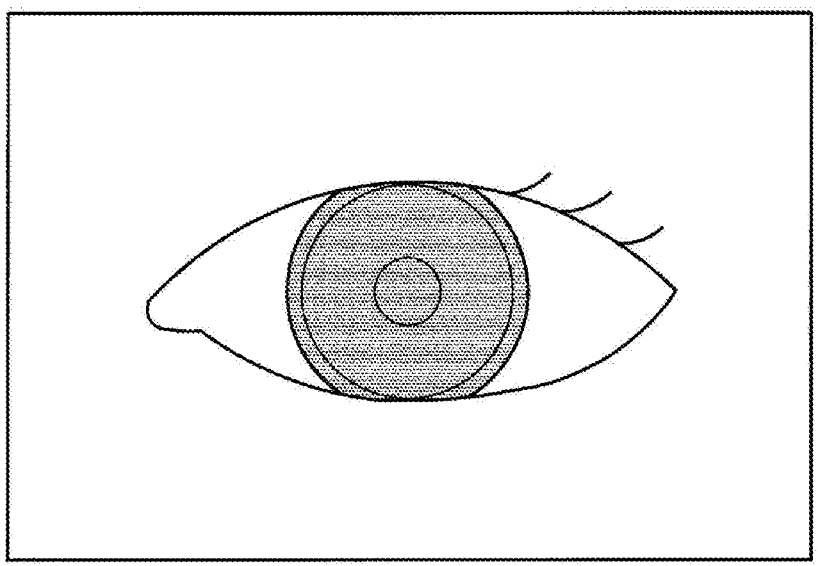
FIG. 6 is a diagram illustrating an example of a cause why a favorable iris is not acquired.

FIG. 6 is a diagram illustrating an example where a favorable iris is not acquired because of a color contact lens. In a case Where the user wears a color contact lens, a part of the iris region or the whole iris region is covered by the color contact lens as illustrated in FIG. 6, and therefore a favorable iris is not acquired and iris authentication fails in some cases.

Note that the causes why a favorable iris is not acquired, which have been described with reference to FIGS. 1 to 6 are merely examples, and a favorable iris is not acquired because of various other causes and iris authentication fails in some cases.

Herein, in an existing technology, it is difficult to acquire a favorable iris in some cases. For example, in JP 2007-257040A cited above, in a case where authentication fails, the user can recognize a cause of the failure on the basis of a notification from a device. However, the user has to consider a method of removing the cause by himself/herself. There are various causes of the failure. For example, there are a plurality of causes of the failure, a method for removing a cause of the failure is complicated, or a cause of the failure cannot be removed only by an action of the user.

As described above, when iris authentication frequently fails because a favorable iris is not acquired, a desire of the user to use iris authentication may be reduced. With this, it is expected that the user switches an authentication method from iris authentication to authentication using an ID and password. However, an ID and password may be illegally acquired by a third party, and therefore a security level may be reduced.

In view of this, a disclosing party of the present application has made the present disclosure in view of the above circumstances. In a case where a device according to an embodiment of the present disclosure determines that a favorable iris has not been acquired (i.e., iris authentication has not been appropriately performed), the device can prompt the user to perform predetermined behavior or control the own device or an external device in order to realize an acquisition environment for acquiring a favorable iris and can therefore realize an environment for acquiring a favorable iris. Further, the device according to the embodiment of the present disclosure can determine whether or not a favorable iris is acquired and perform processing for realizing an acquisition environment for acquiring a favorable iris not only after iris authentication fails but also in advance.

With this, the device according to the embodiment of the present disclosure can realize an environment for acquiring a favorable iris more smoothly and can appropriately perform iris authentication, as compared to a device that provides only a notification of a cause of a failure of authentication, and can therefore increase a desire of the user to use iris authentication. Hereinafter, an outline of the present disclosure, specific examples of the present disclosure, a functional configuration of the device, operation of the device, a hardware configuration, and the like will be described in order.

<2. Outline of Present Disclosure>

Hereinabove, the background of the present disclosure has been described. Next, an outline of the present disclosure will be described.

The present disclosure discloses a technology that, in a case where it is determined that iris authentication has not been appropriately performed (i.e., favorable iris has not been acquired), specifies a cause thereof, determines a method of removing the cause, and performs various kinds of control. Herein, the various kinds of control may be, for example, control to prompt the user to perform some behavior or control to operate the own device or an external device.

Further, the present disclosure also discloses a technology that determines whether or not iris authentication is appropriately performed (i.e., whether or not a favorable iris is acquired j not only after iris authentication fails but also before iris authentication, and, in a case where it is determined that iris authentication is not appropriately performed, specifies a cause thereof, determines a method of removing the cause, and performs various kinds of control.

Note that the present disclosure can be applied to various systems or devices. Hereinafter, as an example, a case where the present disclosure is applied to electronic devices such as "smartphone 100" and "eyeglass-type wearable terminal 200" (hereinafter, referred to as "eyeglass-type terminal 200" for the sake of convenience) will be described. Note that, hereinafter, the smartphone 100 and the eyeglass-type terminal 200 according to an embodiment of the present disclosure will also be referred to as "device according to an embodiment of the present disclosure".

Figure 7:
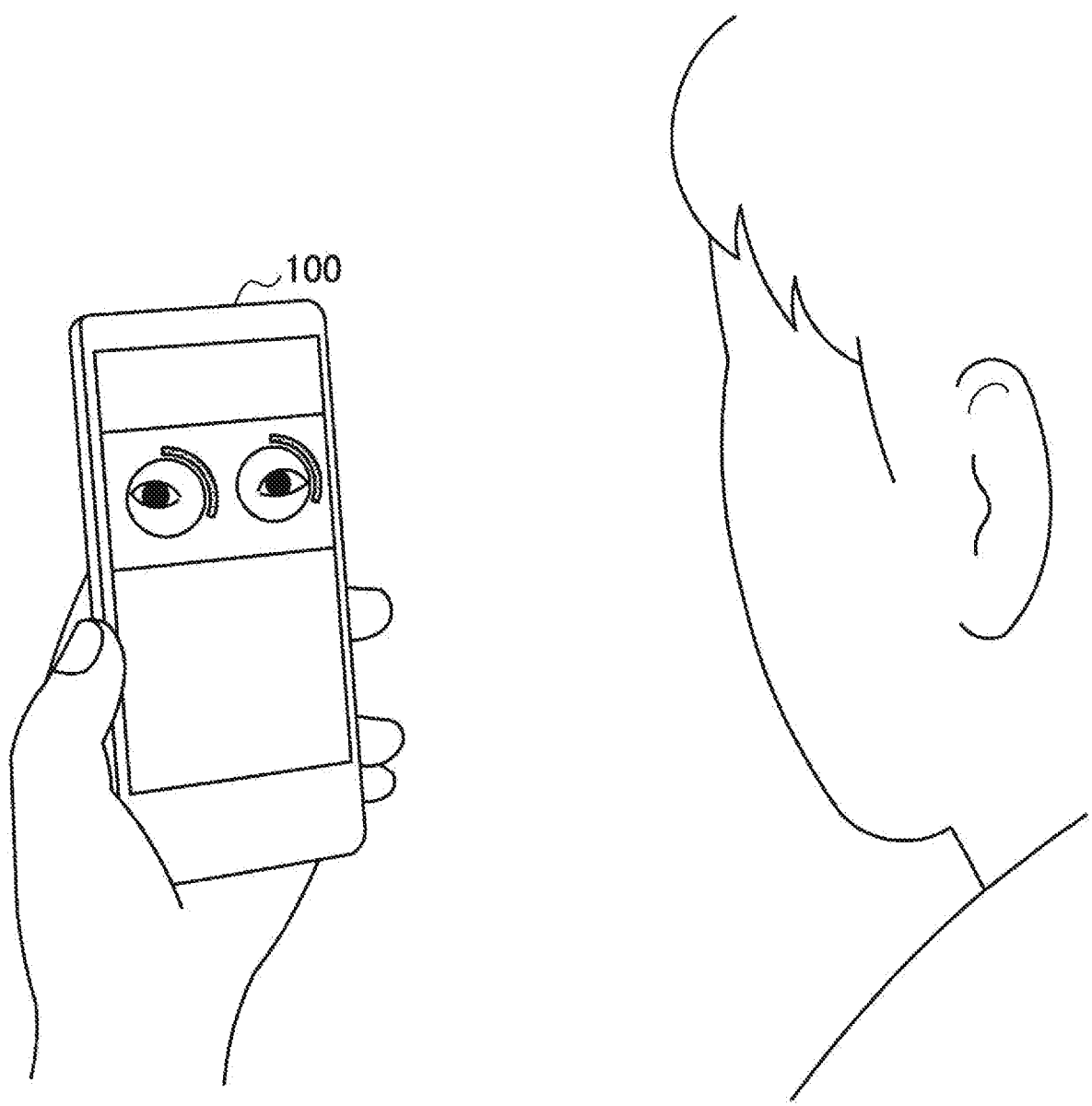
FIG. 7 is an image diagram in which an embodiment of the present disclosure is applied to a smartphone.

Herein, a case where the present disclosure is applied to the smartphone 100 will be described with reference to FIG. 7. FIG. 7 is an image diagram in which the present disclosure is applied to the smartphone 100. As illustrated in FIG. 7, for example, the smartphone 100 can cause an image capturing unit (camera) provided in the vicinity of a display to capture an image of eyes of a user while the user is visually recognizing the display and perform iris authentication by using the captured image.

Note that the smartphone 100 performs iris authentication at an arbitrary timing. For example, the smartphone 100 may perform iris authentication in a case where the user performs login processing. Further, FIG. 7 illustrates an example where an image of both the eyes of the user is captured. However, the present embodiment is not limited thereto, and the smartphone 100 may perform iris authentication by using a captured image of only one of the eyes of the user.

In order to acquire a favorable iris, for example, the smartphone 100 according to the embodiment of the present disclosure guides the user by using display on the display or audio or controls an external device.

Figure 8:
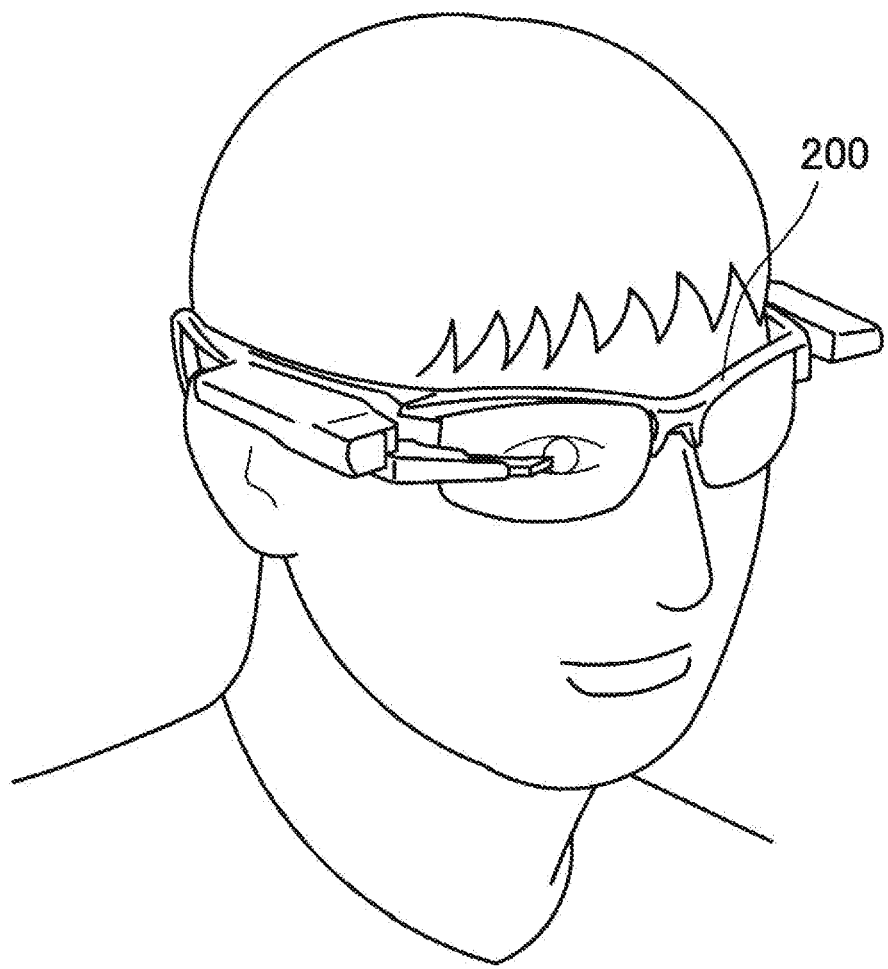
FIG. 8 is an image diagram in which an embodiment of the present disclosure is applied to an eyeglass-type terminal.

Next, a case where the present disclosure is applied to the eyeglass-type terminal 200 will be described with reference to FIG. 8. FIG. 8 is an image diagram in which the present disclosure is applied to the eyeglass-type terminal 200. As illustrated in FIG. 8, for example, the eyeglass-type terminal 200 includes an image capturing unit (camera) at a position at which an image of the eye of the user can be easily captured in a case where the eyeglass-type terminal 200 is worn by the user. Therefore, the eyeglass-type terminal 200 can capture an image of the eye of the user in a state in which the user wears the eyeglass-type terminal 200 and perform iris authentication by using the captured image.

Note that the eyeglass-type terminal 200 performs iris authentication at an arbitrary timing. For example, the eyeglass-type terminal 200, as well as the smartphone 100 may perform iris authentication in a case where the user performs login processing. Further, FIG. 8 illustrates a transmitting-type eyeglass-type wearable terminal as an example of the eyeglass-type terminal 200. However, the present embodiment is not limited thereto, and the eyeglass-type terminal 200 may be a shielding-type wearable terminal or may be a terminal additionally attached to general eyeglasses.

In order to acquire a favorable iris, for example, the eyeglass-type terminal 200 according to the embodiment of the present disclosure guides the user by using display on the display or audio, controls a component such as a polarizing filter included in the own device, or controls an external device.

<3. Specific Examples of Present Disclosure>

Hereinabove, the outline of the present disclosure has been described. Next, specific examples of operation of each device in various situations will be described.

(3-1. Case Where Image Capturing Processing is Performed in Direct Sunlight)

In a case where image capturing processing is performed in direct sunlight, there is a possibility that a favorable iris is not acquired because sunlight is reflected by an eye or blown-out highlights are generated in a captured image.

The device according to the embodiment of the present disclosure recognizes that the user is outside by, for example, analyzing the captured image or analyzing sensing data from various kinds of sensors such as a global positioning system (GPS) sensor, an illuminance sensor, and a temperature sensor, and determines that a favorable iris has not been acquired because the image capturing processing has been performed in direct sunlight. Herein, the device according to the embodiment of the present disclosure can improve accuracy of the above determination by acquiring, from an external device, weather information of a place and time at which the image capturing processing has been performed and performing processing also in consideration of the weather information.

(3-1-1. Control by Smartphone 100)

In a case where the smartphone 100 according to the embodiment of the present disclosure determines that a favorable iris has not been acquired because image capturing processing has been performed in direct sunlight, the smartphone 100 may display various kinds of messages on the display to prompt the user to perform predetermined behavior. For example, the smartphone 100 may display a message such as "It may be impossible to perform iris authentication in direct sunlight. Please move into the shade and try again." on the display to prompt the user to move into the shade.

Figure 9:
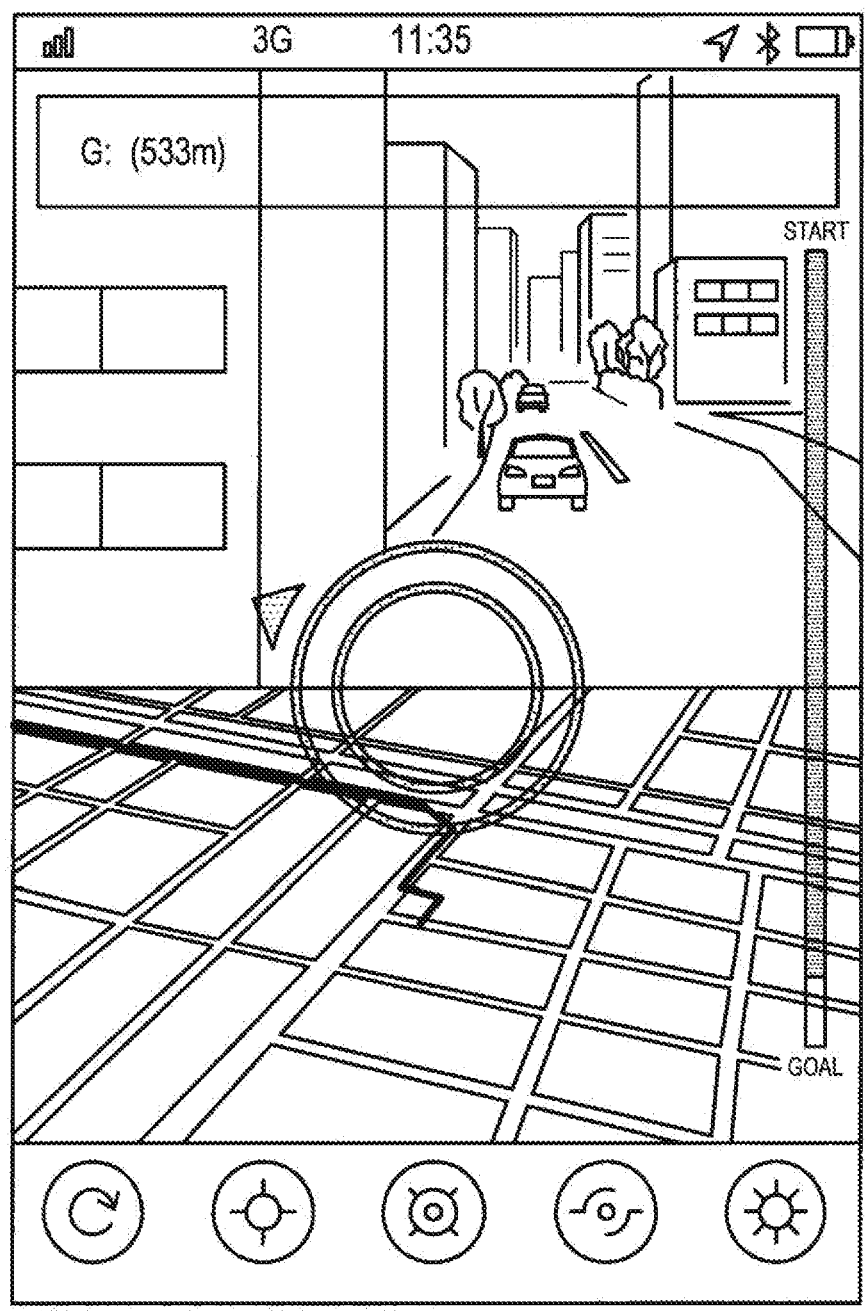
FIG. 9 is an image diagram of an example where a smartphone according to an embodiment of the present disclosure guides a user by using an AR technology and map information.

Further, the smartphone 100 may guide the user by using an augmented reality (AR) technology or map information. Herein, a guiding example using the AR technology and map information will be described with reference to FIG. 9. FIG. 9 is an image diagram of an example Where the smartphone 100 according to the embodiment of the present disclosure guides the user by using the AR technology and map information. As illustrated in FIG. 9, the smartphone 100 according to the embodiment of the present disclosure may display a captured image in which an image of a surrounding environment of the user is captured while an object such as an arrow is being superimposed thereon or may display the captured image together with a map, thereby showing a method, a path, or the like to arrive at a spot suitable for image capturing processing (e.g., a spot in the shade) to the user.

Figure 10:
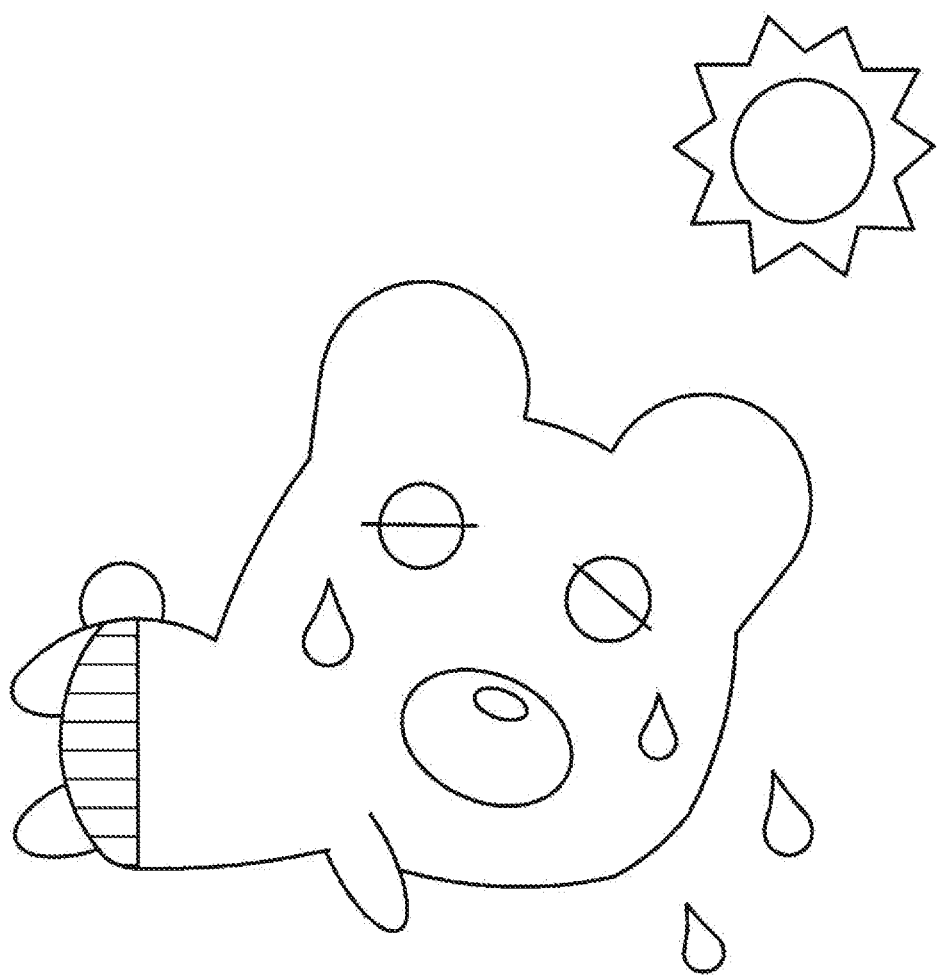
FIG. 10 is a diagram illustrating an example of a character displayed on a display in order to notify a user that a favorable iris is not acquired because of direct sunlight and guide the user.

Further, the smartphone 100 may display a predetermined character on the display to guide the user. Herein, an example of the character displayed on the display will be described with reference to FIG. 10. FIG. 10 is a diagram illustrating an example of a character displayed on the display in order to notify the user that a favorable iris is not acquired because of direct sunlight and guide the user. For example, the smartphone 100 displays the character illustrated in FIG. 10 (e.g., the character that is exhausted because of heat) on the display and does not perform processing of iris authentication while the user is receiving direct sunlight. Thereafter, in a case where the user moves into the shade, the smartphone 100 may notify the user that iris authentication can be appropriately performed by, for example, changing the character illustrated in FIG. 10 (e.g., changing a state of the character to a normal state in which the character is not exhausted) and perform processing of iris authentication.

(3-1-2. Control by Eyeglass-Type Terminal 200)

In a case where the eyeglass-type terminal 200 according to the embodiment of the present disclosure determines that a favorable iris has not been acquired because image capturing processing has been performed in direct sunlight, the eyeglass-type terminal 200 may perform control similar to that of the above smartphone 100. That is, the eyeglass-type terminal 200 may display various kinds of messages or characters on the display or perform guidance by using the AR technology and map information.

Further, the eyeglass-type terminal 200 may, for example, reduce an amount of light incident on the eve by using the polarizing filter included in the own device. For example, the eyeglass-type terminal 200 notifies the user of the use of the polarizing filter by using predetermined display, predetermined audio, or the like, and, in a case where the user agrees, the polarizing filter is used. Note that the polarizing filter is merely an example, and the eyeglass-type terminal 200 may implement any method as long as the method is a method of adjusting the amount of light incident on the eye. For example, the eyeglass-type terminal 200 may include a movable sunshade and therefore, in a case where image capturing processing is performed in direct sunlight, reduce the amount of light incident on the eye by using the sunshade.

(3-2. Case Where Image Capturing Processing is Performed in State of Half-Open Eye)

In a case where image capturing processing is performed in a state in which the eye of the user is a half-open eye, there is a possibility that a favorable iris is not acquired because an iris region is small. Further, in a case where an iris region in a captured image is small because an obstruction such as eyelashes exists between the eye of the user and the image capturing unit (camera), as well as in a state of the half-open eye, there is a possibility that a favorable iris is not acquired.

In a case where an area of the iris region extracted from the captured image is smaller than a predetermined threshold, the device according to the embodiment of the present disclosure analyzes the captured image, specifies a state of a part around the eye such as an eyelid, and therefore determine whether or not the eye of the user is a half-open eye. Further, in a case where the area of the iris region extracted from the captured image is smaller than the predetermined threshold, the device according to the embodiment of the present disclosure may analyze the captured image, specifies presence/absence and a state of an obstruction such as eyelashes, and therefore determine that the obstruction such as eyelashes prevents acquisition of a favorable iris.

(3-2-1. Control by Smartphone)

In a case where the smartphone 100 according to the embodiment of the present disclosure determines that a favorable iris has not been acquired because image capturing processing has been performed in a state in which the eye of the user has been a half-open eye, the smartphone 100 may display various kinds of messages on the display to prompt the user to perform predetermined behavior. For example, the smartphone 100 may display a message such as "Your eye is narrow. Please open your eye wide." on the display to prompt the user to open the eye wide.

Further, the smartphone 100 may display a predetermined character on the display to guide the user. For example, the smartphone 100 may display, on the display, a character whose degree of opening of an eye is changed in conjunction with a degree of opening of the eye of the user, thereby notifying the user of the degree of opening of the eye and causing the user to open the eye wide.

Further, the smartphone 100 may attempt to acquire an iris in a case where the user uses an application for makeup or fixing makeup (which is expected to be an application in which a captured image of a face is displayed on the display; hereinafter, referred to as "makeup application" for the sake of convenience). In particular, the smartphone 100 acquires an iris while the user is putting on eyeliner and can therefore acquire the iris more naturally and more smoothly. Utilization of the makeup application is merely an example, and any application may be used as long as the application causes the user to open the eye wide. For example, an application that surprises the user to cause the user to easily open the eye wide may be used.

(3-2-2. Control by Eyeglass-Type Terminal 200)

In a case where the eyeglass-type terminal 200 according to the embodiment of the present disclosure determines that a favorable iris has not been acquired because image capturing processing has been performed in a state in which the eye of the user has been a half-open eye, the eyeglass-type terminal 200 may perform control similar to that of the above smartphone 100. That is, the eyeglass-type terminal 200 may display various kinds of messages or characters on the display or use a predetermined application to open the eye of the user wide.

Further, the eyeglass-type terminal 200 may open the eye of the user wide by using a predetermined marker. For example, the eyeglass-type terminal 200 may gradually open the eye of the user wide by displaying a predetermined marker on the display and gradually changing the marker so that the marker has a vertically long shape. Further, the eyeglass-type terminal 200 may include a 3D display and gradually open the eye of the user wide by displaying a three-dimensional marker on the 3D display and displaying the marker so that the marker moves from a distant place to a near place.

Further, the eyeglass-type terminal 200 may cause the degree of opening of the eye to be in conjunction with the polarizing filter. For example, in a case where the eye is not opened wide, the eyeglass-type terminal 200 reduces an amount of light incident on the eye by using the polarizing filter to make a surrounding environment less visible to the user. When the user reflectively opens the eye wide in order to see the surrounding environment, the eyeglass-type terminal 200 acquires an iris and increases the amount of light incident on the eye. As described above, the eyeglass-type terminal 200 may acquire an iris by using a reflective movement of the user.

(3-3. Case Where Image Capturing Processing is Performed in State in Which Iris is Shifted)

When image capturing processing is performed in a case where, for example, a face of the user is not directed toward the image capturing unit (camera), there is a possibility that an iris in a captured image is shifted and a favorable iris is not acquired.

By analyzing, for example, the captured image, the device according to the embodiment of the present disclosure recognizes that an iris region is not included in the captured image or the iris region is not directed toward the image capturing unit (camera) and determines that the iris is shifted.

(3-3-1. Control by Smartphone 100)

In a case where the smartphone 100 according to the embodiment of the present disclosure determines that a favorable iris has not been acquired because the iris has been shifted, the smartphone 100 may display various kinds of messages on the display to prompt the user to perform predetermined behavior. For example, the smartphone 100 may display a message such as "A position of your eye (iris) seems not correct. Please see a direction of an arrow." on the display to prompt the user to correct the position of the iris.

Further, the smartphone 100 may display a predetermined character on the display to guide the user. For example, the smartphone 100 may display, on the display, a character whose display position is changed in conjunction with the position of the iris, thereby notifying the user of the position of the iris and prompting the user to correct the position of the iris. Further, the smartphone 100 may display the character while moving the character so that the user is caused to follow the character with the eye to correct the position of the iris.

(3-3-2. Control by eyeglass-type terminal 200)

In a case where the eyeglass-type terminal 200 according to the embodiment of the present disclosure determines that a favorable iris has not been acquired because the iris has been shifted, the eyeglass-type terminal 200 may perform control similar to that of the above smartphone 100. That is, the eyeglass-type terminal 200 may, for example, display various kinds of messages or characters on the display to prompt the user to correct the position of the iris.

Further, the eyeglass-type terminal 200 may prompt the user to correct the position of the iris by using a predetermined marker. For example, the eyeglass-type terminal 200 may prompt the user to correct the position of the iris by displaying a predetermined marker on the display and moving the marker in a state in which the user is caused to stare at the marker.

Further, the eyeglass-type terminal 200 may cause a shift amount of the iris to be in conjunction with the polarizing filter. For example, in a case where, for example, a shock is given from the outside and therefore the eyeglass-type terminal 200 is shifted and the iris is also shifted, the eyeglass-type terminal 200 may reduce an amount of light incident on the eye by using the polarizing filter, thereby notifying the user that the iris is shifted and prompting the user to put on the own device again.

(3-4. Case Where Image Capturing Processing is Performed in State in Which Iris is Blurred)

In a case where image capturing processing is performed while the user or image capturing unit (camera) is strongly moving, there is a possibility that an image of the iris is captured in a state in which the iris is blurred and a favorable iris is not acquired.

The device according to the embodiment of the present disclosure, for example, analyzes sensing data from various kinds of sensors (acceleration sensor, gyro sensor, and the like) of the own device or an external device worn by the user and therefore recognize a movement of the user or image capturing unit (camera). Then, in a case where the iris in a captured image is blurred or has an elongated shape, the device according to the embodiment of the present disclosure determines that the iris is blurred on the basis of the movement of the user or the like.

(3-4-1. Control by Smartphone 100)

In a case where the smartphone 100 according to the embodiment of the present disclosure determines that a favorable iris has not been acquired because of the movement of the user or the like, the smartphone 100 may display various kinds of messages on the display to prompt the user to perform predetermined behavior. For example, the smartphone 100 may display a message such as "Your head (or terminal) seems to be moving. Please stop." on the display to prompt the user to eliminate a blur of the iris.

Further, in a case where the smartphone 100 determines that, because the user has attempted to perform iris authentication while riding a bicycle or the like, an image of the iris has been captured in a state in which the iris has been blurred, the smartphone 100 may display a message such as "Please stop at a safe place and try again." on the display or may stop an iris authentication function during a ride on the bicycle or the like.

Further, the smartphone 100 may display a predetermined character on the display to guide the user. For example, the smartphone 100 may change a movement of the character in conjunction with strength of the movement of the user or the like (e.g., vibration of the character is stronger as the movement of the user or the like is stronger and the vibration of the character stops when the movement of the user or the like stops), thereby notifying the user of strength of the movement and prompting the user to stop the movement.

(3-4-2. Control by Eyeglass-Type Terminal 200)

In a case where the eyeglass-type terminal 200 according to the embodiment of the present disclosure determines that a favorable iris has not been acquired because of the movement of the user or the like, the eyeglass-type terminal 200 may perform control similar to that of the above smartphone 100. That is, the eyeglass-type terminal 200 may, for example, display various kinds of messages or characters on the display to prompt the user to stop.

Further, the eyeglass-type terminal 200 may prompt the user to stop by using a predetermined marker. For example, the eyeglass-type terminal 200 may notify the user of the strength of the movement and prompt the user to stop by displaying, on the display, a marker moving in conjunction with the strength of the movement of the user or the like.

Further, the eyeglass-type terminal 200 may cause the movement of the user or the like to be in conjunction with the polarizing filter. For example, the eyeglass-type terminal 200 may reduce an amount of light incident on the eye by using the polarizing filter as the movement of the user or the like is stronger, thereby notifying the user of the strength of the movement and prompting the user to stop.

(3-5. Case Where Image Capturing Processing is Performed in State in Which Pupil is Dilated)

A sympathetic nerve is superior and a pupil is dilated (pupil diameter is increased) in a state in which, for example, the user is excited. In a case where image capturing processing is performed while the pupil is being dilated, there is a possibility that a favorable iris is not acquired because an area of the iris region in a captured image is reduced.

The device according to the embodiment of the present disclosure, for example, analyzes sensing data from various kinds of sensors (heart rate sensor, pulse wave sensor, brain wave sensor, blood pressure sensor, and the like) of the own device or an external device worn by the user and therefore determines whether or not the sympathetic nerve is superior. Then, in a case where the sympathetic nerve is superior and the area of the iris region in the captured image is smaller than a predetermined threshold, the device according to the embodiment of the present disclosure determines that the area of the iris region is reduced because of dilation of the pupil.

(3-5-1. Control by Smartphone 100)

In a case where the smartphone 100 according to the embodiment of the present disclosure determines that a favorable iris has not been acquired because of dilation of the pupil, the smartphone 100 may display various kinds of messages on the display to prompt the user to perform predetermined behavior. For example, the smartphone 100 may display a message such as "You seem to be very excited. Please breathe deeply and calm down." on the display to calm the user down.

Further, the smartphone 100 may display an object for lowering activity of the sympathetic nerve on the display. For example, the smartphone 100 may display an image of a forest or a bluish object on the display to calm the user down.

Further, the smartphone 100 may display a heart rate (i.e., perform biofeedback) on the display, thereby notifying the user that the user is in a state of excitement and prompting the user to calm down.

Further, the smartphone 100 may display a predetermined character on the display to guide the user. For example, the smartphone 100 may change a state of the character in conjunction with excitement of the sympathetic nerve (e.g., the character becomes excited as the sympathetic nerve becomes excited), thereby notifying the user that the user is in a state of excitement and prompting the user to calm down.

Further, the smartphone 100 may calm the user down by playing music having a high effect of relaxing the user due to activity of the parasympathetic nerve.

(3-5-2. Control by Eyeglass-Type Terminal 200)

In a case where the eyeglass-type terminal 200 according to the embodiment of the present disclosure determines that a favorable iris has not been acquired because of dilation of the pupil, the eyeglass-type terminal 200 may perform control similar to that of the above smartphone 100. That is, the eyeglass-type terminal 200 may calm down the user by displaying various kinds of objects on the display or playing predetermined music.

Further, the eyeglass-type terminal 200 may cause a degree of dilation of the pupil to be in conjunction with the polarizing filter. For example, the eyeglass-type terminal 200 may reduce an amount of light incident on the eye by using the polarizing filter as the pupil is dilated and then notify the user that the user is in a state of excitement and prompt the user to calm down by playing music having a high effect of relaxing the user.

(3-6. Case Where Image Capturing Processing is Performed in State in Which Color Contact Lens is Worn)

In a case where the user wears a color contact lens, the whole iris region or a part thereof is covered by the color contact lens and a favorable iris is not acquired in some cases.

For example, the device according to the embodiment of the present disclosure analyzes a captured image, recognizes that, for example, a pattern of a region in which the iris is considered to be located is uniform (or repetition of a predetermined pattern), and therefore determines that the user wears a color contact lens.

(3-6-1. Control by Smartphone 100)

In a case where the smartphone 100 according to the embodiment of the present disclosure determines that the user wears a color contact lens, the smartphone 100 may display various kinds of messages on the display to prompt the user to perform predetermined behavior. For example, the smartphone 100 may display a message such as "It may be impossible to perform iris authentication when you wears a color contact lens. Please remove the color contact lens." on the display to prompt the user to remove the color contact lens.

Further, the smartphone 100 may display a predetermined character on the display to provide a notification to the user. For example, in a case where the smartphone 100 determines that the user wears a color contact lens, the smartphone 100 may display a character that wears a color contact lens on the display, thereby notifying the user that it may be impossible to perform iris authentication and prompting the user to remove the color contact lens.

(3-6-2. Control by Eyeglass-Type Terminal 200)

In a case where the eyeglass-type terminal 200 according to the embodiment of the present disclosure determines that the user wears a color contact lens, the eyeglass-type terminal 200 may perform control similar to that of the above smartphone 100. That is, the eyeglass-type terminal 200 may, for example, display various kinds of messages or characters on the display, thereby notifying the user that it may be impossible to perform iris authentication and prompting the user to remove the color contact lens.

Note that the eyeglass-type terminal 200 may provide the above notification not only when iris authentication is performed but also when the eyeglass-type terminal 200 determines that a color contact lens is worn. With this, the user can recognize that it may be impossible to perform iris authentication because of the color contact lens in a shorter time from wearing of the color contact lens and can therefore remove the color contact lens without strong resistance.

The above cases are merely examples and may therefore be arbitrarily changed, or a favorable iris may be acquired by other methods. For example, the device according to the embodiment of the present disclosure may acquire the iris in a divided manner. More specifically, in a case where an image of a part of the iris is not appropriately captured for some cause, the device according to the embodiment of the present disclosure acquires only a partial image that has been appropriately captured. Then, in a case where a remaining partial image is appropriately captured by subsequent image capturing processing, the device according to the embodiment of the present disclosure may acquire the remaining partial image and add the remaining partial image to the partial image that has been previously acquired, thereby generating a captured image of a favorable iris. With this method, the device according to the embodiment of the present disclosure can acquire a favorable iris without requesting the user to perform a predetermined action.

<4. Functional Configuration of Device>

Figure 11:
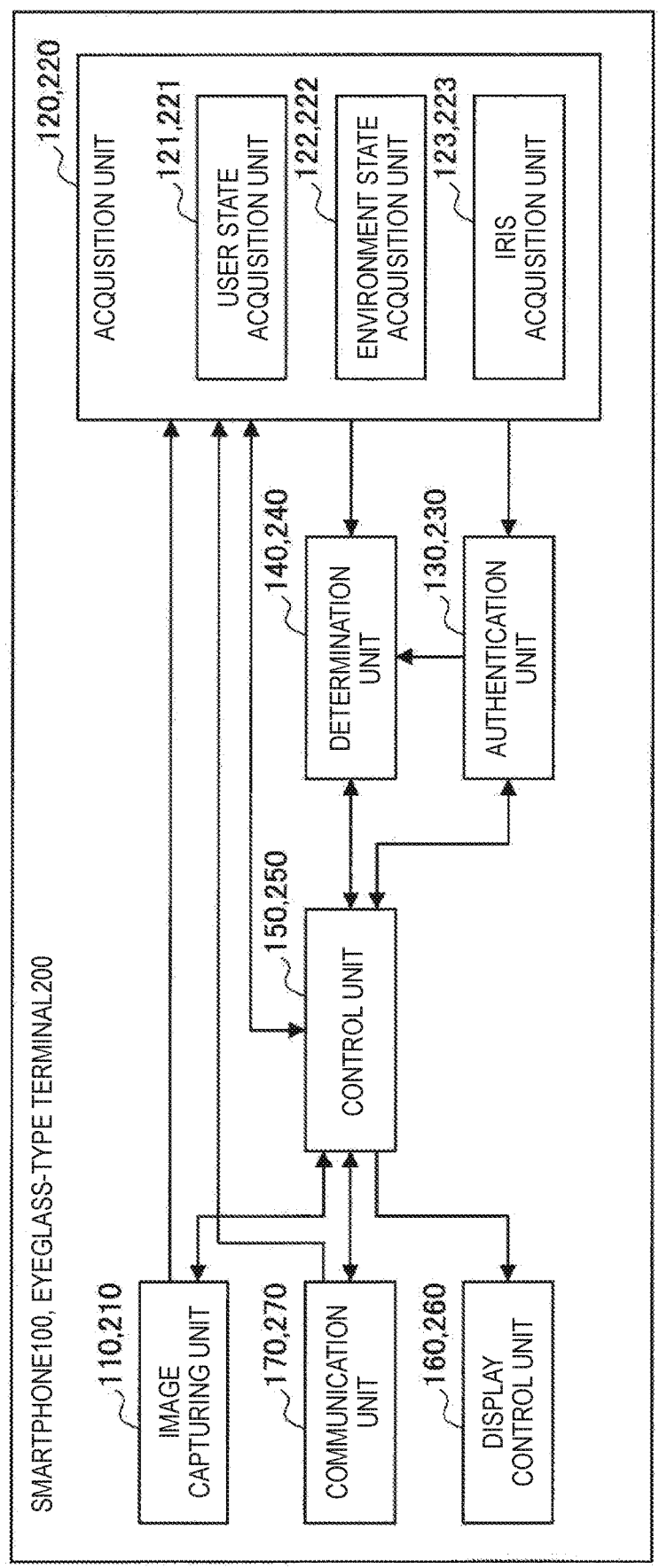
FIG. 11 is a diagram illustrating functional configurations that a smartphone and eyeglass-type terminal according to an embodiment of the present disclosure have.

Hereinabove, the specific examples of operation of each device in various situation have been described. Next, functional configurations that the smartphone 100 and the eyeglass-type terminal 200 according to the embodiment of the present disclosure have will be described with reference to FIG. 11. FIG. 11 is a diagram illustrating functional configurations that the smartphone 100 and the eyeglass-type terminal 200 according to the embodiment of the present disclosure have. Note that the smartphone 100 and the eyeglass-type terminal 200 can have a similar functional configuration, and therefore a functional configuration of the smartphone 100 will be mainly described below and a function peculiar to the eyeglass-type terminal 200 will be specially described.

As illustrated in FIG. 11, the smartphone 100 according to the embodiment of the present disclosure includes an image capturing unit 110, an acquisition unit 120, an authentication unit 130, a determination unit 140, a control unit 150, a display control unit 160, and a communication unit 170. Further, the acquisition unit 120 includes a user state acquisition unit 121, an environment state acquisition unit 122, and an iris acquisition unit 123.

(Image Capturing Unit 110)

The image capturing unit 110 captures an image of an eye of a user and generates a captured image. For example, the image capturing unit 110 is provided in the vicinity of the display of the smartphone 100 and can capture an image of the eye of the user in a case where the user visually recognizes the display of the smartphone 100. Further, an image capturing unit 210 of the eyeglass-type terminal 200 is provided at a position at which an image of the eye of the user can be easily captured in a case where the user wears the eyeglass-type terminal 200 and can capture an image of the eye of the user in a state in which the user wears the eyeglass-type terminal 200. The generated captured image is provided to the acquisition unit 120.

(Acquisition Unit 120)

The acquisition unit 120 acquires various kinds of information. For example, the acquisition unit 120 acquires information regarding a state of the user or information regarding a state of a surrounding environment of the user. Based on those pieces of information, the determination unit 140 described below can determine whether or not a favorable iris has been acquired (or whether or not there is a high possibility that a favorable iris is acquired) and determine a method for acquiring a favorable iris. Further, the acquisition unit 120 acquires a captured image of an iris from the captured image generated by the image capturing unit 110. Based on the acquired captured image of the iris, the authentication unit 130 described below can perform iris authentication. As described above, the acquisition unit 120 includes the user state acquisition unit 121, the environment state acquisition unit 122, and the iris acquisition unit 123. Hereinafter, each functional configuration will be described.

(User State Acquisition Unit 121)

The user state acquisition unit 121 acquires information regarding a state of the user as described above. The information has arbitrary content. For example, the user state acquisition unit 121 may acquire information regarding a body of the user (or an object attached to the body) such as a direction of a face, a degree of opening of the eye, a state of an eyelid, a state of eyelashes, a direction of a line of sight, strength of a movement of the body (including eye), and whether or not a contact lens (including a color contact lens) is worn. Further, the user state acquisition unit 121 may acquire information regarding an internal state of the user (including information regarding a state of a sympathetic nerve) such as an awake state, a state of excitement, and a state of fatigue. Further, the user state acquisition unit 121 may acquire information regarding a place in which the user is located (a position on a map, a position in facilities, or the like). Further, the user state acquisition unit 121 may acquire information regarding whether or not the user rides on some sort of vehicle (automobile, train, bicycle, motorcycle, or the like), whether or not the user performs some sort of action (walking action, running action, sitting action, action of having a meal, action of doing housework, action in playing sport, or the like), and the like.

Further, an acquisition source and acquiring method of the above various kinds of information are arbitrary. For example, the user state acquisition unit 121 may acquire the above information by analyzing the captured image provided from the image capturing unit 110 or may acquire the above information by analyzing sensing data from various kinds of sensors included in the own device or an external device. Herein, the various kinds of sensors are various sensors such as an acceleration sensor, a gyro sensor, a geomagnetic sensor, a barometric sensor, a temperature sensor, a vibration sensor, an audio sensor, a heart rate sensor, a pulse wave sensor, a brain wave sensor, a blood pressure sensor, a proximity sensor, an illuminance sensor, a pressure sensor, a position sensor (GPS sensor or the like), a perspiration sensor, a pH sensor, a humidity sensor, and an infrared sensor. The user state acquisition unit 121 provides the acquired various kinds of information to the determination unit 140, the iris acquisition unit 123, and the control unit 150 described below.

(Environment State Acquisition Unit 122)

The environment state acquisition unit 122 acquires information regarding a state of a surrounding environment of the user. The information has arbitrary content. For example, the environment state acquisition unit 112 may acquire information regarding weather (temperature, precipitation, cloud cover, wind direction, wind speed, barometric pressure, and the like) in a place in which the user is located, a geographical characteristic of the place (distribution of land, sea, mountains, and rivers, climate, position of building, and the like), presence/absence of a light source, a radiation direction of light (including sunlight), and presence/absence of an obstruction at the time of capturing an image, and the like.

Further, an acquisition source and acquiring method of the above various kinds of information are arbitrary. For example, the environment state acquisition unit 122, as well as the user state acquisition unit 121, may acquire the above information by analyzing the captured image provided from the image capturing unit 110 or may acquire the above information by analyzing sensing data from various kinds of sensors included in the own device or an external device. The environment state acquisition unit 122 provides the acquired various kinds of information to the determination unit 140, the iris acquisition unit 123 and the control unit 150 described below.

Further, the environment state acquisition unit 122 acquires not only the above information but also control information regarding presence/absence of an external device controllable by the own device and control information necessary for controlling the external device (identification information of external device, version information, information regarding communication method, and the like). For example, the environment state acquisition unit 122 acquires those pieces of control information from the external device via the communication unit 170 described below. Then, the environment state acquisition unit 122 provides those pieces of control information to the control unit 150 described below (Iris Acquisition Unit 123)

The iris acquisition unit 123 acquires a captured image of the iris. More specifically, by analyzing the captured image provided from the image capturing unit 110, the iris acquisition unit 123 specifies a region including a pupil and the iris (hereinafter, referred to as "pupil iris region" for the sake of convenience) and specifies a boundary between the pupil and the iris in the pupil iris region, thereby acquiring a captured image of the iris.

Note that, as various kinds of parameters such as which one of captured images of irises of right and left eyes is acquired and how many captured images (or how many seconds of captured images) a captured image of the iris is acquired from, the iris acquisition unit 123 may set prescribed values or set values determined on the basis of the information provided from the user state acquisition unit 121 or the environment state acquisition unit 122. In a case where the various kinds of parameters are set on the basis of the information provided from the user state acquisition unit 121 or the environment state acquisition unit 122, the iris acquisition unit 123 can extract a more appropriate iris on the basis of a state of the user or a state of a surrounding environment of the user. The iris acquisition unit 123 provides the acquired captured image of the iris to the authentication unit 130 described below.

(Authentication Unit 130)

The authentication unit 130 performs iris authentication. More specifically, the authentication unit 130 extracts a feature value of the iris on the basis of the captured image of the iris provided from the iris acquisition unit 123, compares the feature value with feature values of irises of various users registered in advance, and therefore specifies a target user. The authentication unit 130 provides a result of the iris authentication to the determination unit 140 and the control unit 150 described below.

(Determination Unit 140)

In a case where iris authentication fails, the determination unit 140 determines a cause thereof. More specifically, the determination unit 140 determines that iris authentication has failed because a favorable iris has not been acquired (i.e., iris authentication has not been appropriately performed) or iris authentication has failed because the target user is not a registered user (i.e., iris authentication has been appropriately performed). If the determination unit 140 determines that iris authentication has failed because a favorable iris has not been acquired, the determination unit 140 specifies a cause thereof. In a case where it is considered that there are a plurality of causes, the determination unit 140 makes a list of a plurality of possible causes.

Thereafter, the determination unit 140 determines a method of realizing an acquisition environment for acquiring a favorable iris. More specifically, the determination unit 140 determines a method of realizing an acquisition environment for acquiring a favorable iris on the basis of the information regarding a state of the user provided from the user state acquisition unit 121 or the information regarding a state of a surrounding environment of the user provided from the environment state acquisition unit 122.

For example, in a case where a cause of a failure of authentication is a "blur of an iris in a captured image", a state of the user is "moving (by, for example, bicycle)", and a state of a surrounding environment of the user is "safe in a case where the user stops", a method "stopping" is output as the method of realizing an acquisition environment for acquiring a favorable iris. The above processing is merely an example and can be arbitrarily changed. For example, the determination unit 140 may make a determination on the basis of only one of the information regarding a state of the user and the information regarding a state of a surrounding environment of the user or may output a plurality of methods. Further, in a case where the plurality of methods are output, the determination unit 140 may prioritize the methods in consideration of feasibility. Further, the determination unit 140 may determine the method also in consideration of a past history. For example, the determination unit 140 may preferentially select a method by which a favorable iris has been acquired with a higher probability from methods that have been tried for the user in the past, or, in a case where a method that has been previously tried fails, the determination unit 140 may preferentially select another method in consideration of this result. The determination unit 140 provides information regarding the output method to the control unit 150 described below Further, the determination unit 140 may determine a method of realizing an acquisition environment for acquiring a favorable iris not only after iris authentication fails but also in advance. More specifically, the determination unit 140 calculates a possibility that a favorable iris is acquired in advance on the basis of the information regarding a state of the user or the information regarding a state of a surrounding environment of the user. Then, in a case where the determination unit 140 determines that there is a low possibility that a favorable iris is acquired, the determination unit 140 determines a method of realizing an acquisition environment for acquiring a favorable iris.

(Control Unit 150)

The control unit 150 performs various kinds of control for realizing an acquisition environment for acquiring a favorable iris. More specifically, the control unit 150 controls the own device or an external device on the basis of the method output by the determination unit 140 and therefore realizes the acquisition environment.

Further, the control unit 150 comprehensively controls each functional configuration to cause each functional configuration to perform appropriate processing. For example, the control unit 150 controls the image capturing unit 110 to generate a captured image for use in iris authentication or the like. Note that the control unit 150 may control the image capturing unit 110 on the basis of the information regarding a state of the user provided from the user state acquisition unit 121 or the information regarding a state of a surrounding environment of the user provided from the environment state acquisition unit 122. For example, in a case where the user is moving, the control unit 150 may generate more captured images than captured images in normal iris authentication or change various kinds of parameters (sensitivity, exposure time, and the like) in image capturing processing in accordance with brightness in a surrounding environment of the user. For example, in a case where more captured images than captured images in normal iris authentication are generated and a favorable iris can be acquired from any one of the captured images, the device according to the embodiment of the present disclosure can perform appropriate iris authentication by using the favorable iris.

(Display Control Unit 160)

The display control unit 160 controls display processing on the display. For example, the display control unit 160 is controlled by the control unit 150 and therefore displays, for example, a message (e.g., "Please move into the shade.") or a figure (e.g., the character in FIG. 10) for guiding the user on the display. Note that the display control unit 160 may display objects of various kinds of applications irrelevant to iris authentication on the display.

(Communication Unit 170)

The communication unit 170 performs communication between the smartphone 100 and an external device. For example, the communication unit 170 may receive the information regarding a state of the user or the information regarding a state of a surrounding environment of the user from the external device and provide those pieces of information to the acquisition unit 120. Further, the communication unit 170 may transmit signals for controlling the external device, the signals being provided from the control unit 150, to the external device to cause the external device to perform processing. Note that the communication unit 170 may perform communication processing generated in various kinds of applications irrelevant to iris authentication.

<5. Operation of Device>

Hereinabove, the functional configuration of the device according to the embodiment of the present disclosure has been described. Next, operation of the device according to the embodiment of the present disclosure will be described with reference to FIGS. 12 to 14. Note that, although operation of the smartphone 100 will be described below, the eyeglass-type terminal 200 can also perform operation similar to that of the smartphone 100.

(5-1. Operation of Iris Authentication)

Figure 12:
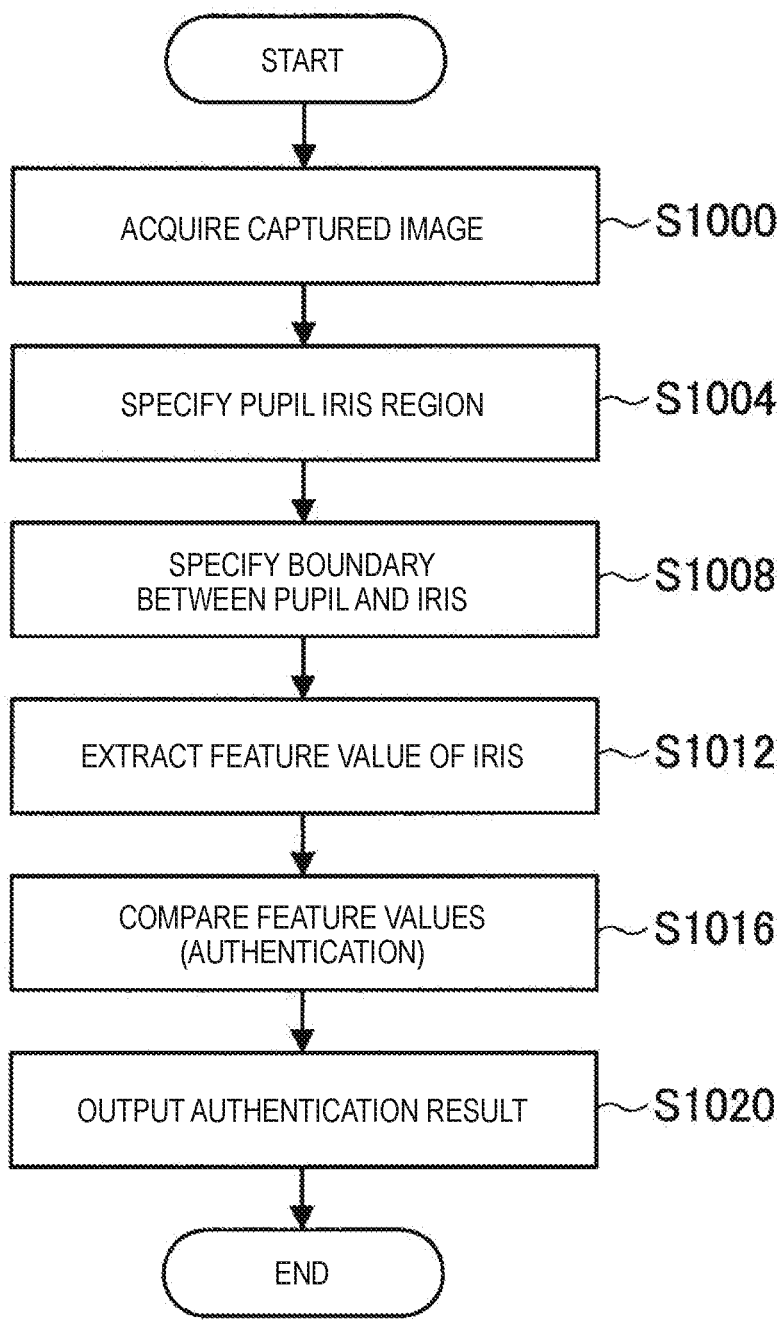
FIG. 12 is a flowchart showing operation of iris authentication.

First, operation of iris authentication will be described with reference to FIG. 12. FIG. 12 is a flowchart showing operation of iris authentication.

In Step S1000, the acquisition unit 120 of the smartphone 100 acquires a captured image captured by the image capturing unit 110. In Step S1004, the iris acquisition unit 123 analyzes the captured image and specifies a pupil iris region. In Step S1008, the iris acquisition unit 123 specifies a boundary between a pupil and an iris in the pupil iris region and therefore acquires a captured image of the iris, In Step S1012, the authentication unit 130 extracts a feature value of the iris on the basis of the captured image of the iris. In Step S1016, the authentication unit 130 performs processing for specifying a target user (i.e., the authentication unit 130 performs authentication processing) by comparing the feature value with feature values of irises of various users registered in advance. In Step S1020, the authentication unit 130 outputs an authentication result, and the iris authentication is terminated.

(5-2. Operation to Realize Environment for Acquiring Favorable Iris After Iris Authentication Fails)

Figure 13:
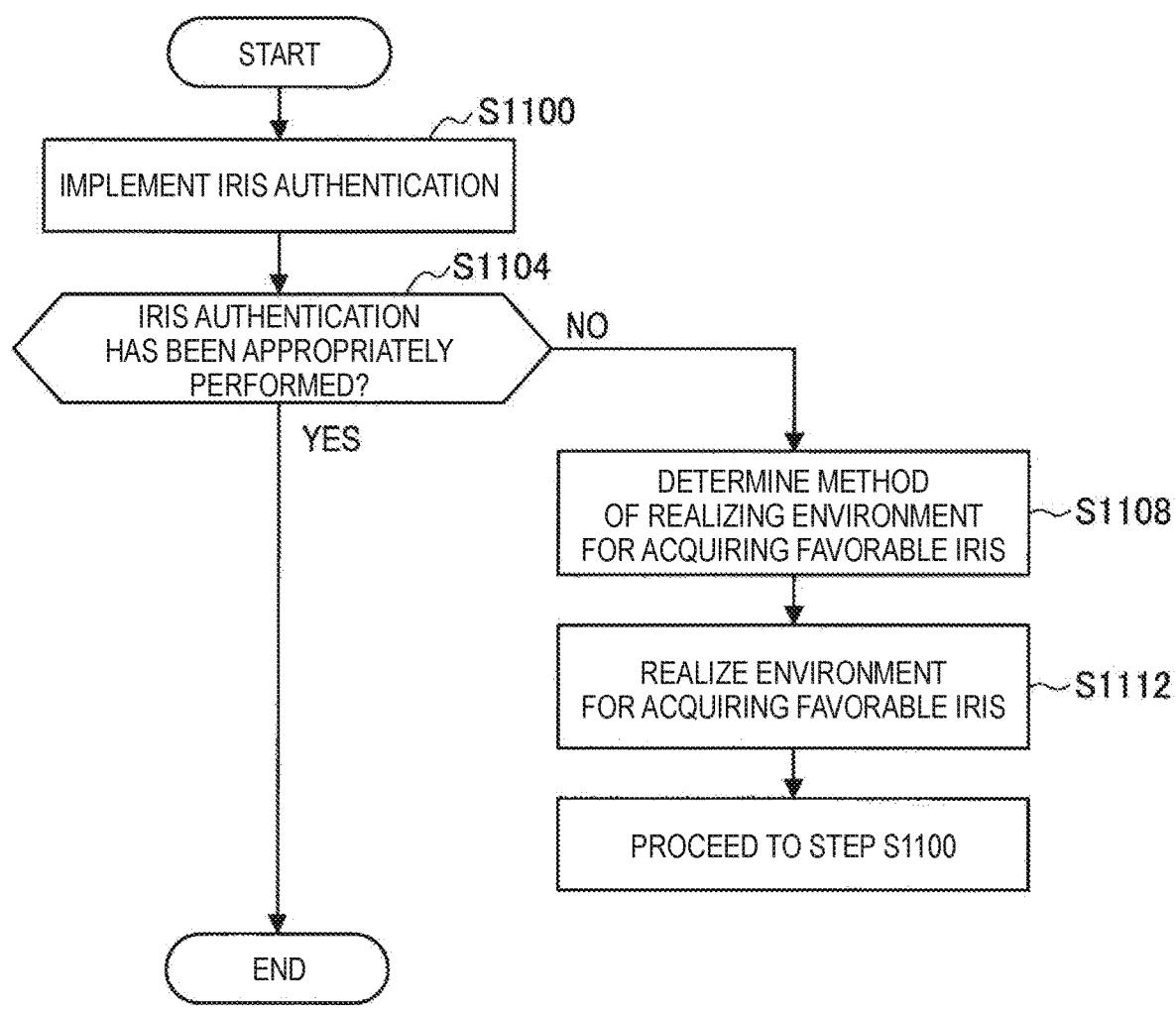
FIG. 13 is a flowchart showing operation to realize an environment for acquiring a favorable iris after iris authentication fails.

Next, operation to realize an environment for acquiring a favorable iris after iris authentication fails will be described with reference to FIG. 13. FIG. 13 is a flowchart showing operation to realize an environment for acquiring a favorable iris after iris authentication fails.

In Step S1100, each functional configuration of the smartphone 100 performs the operation of the iris authentication shown in FIG. 12. In a case where the iris authentication fails and the determination unit 140 determines that the iris authentication has not been appropriately performed (i.e., a favorable iris has not been acquired) (Step S1104/No), the determination unit 140 determines a method of realizing an environment for acquiring a favorable iris in Step S1108.

In Step S1112, the control unit 150 controls each functional configuration on the basis of the method determined by the determination unit 140 and therefore realizes an environment for acquiring a favorable iris. For example, the control unit 150 prompts the user to perform a predetermined action or controls the own device or an external device. Thereafter, the processing proceeds to Step S1100 (i.e., iris authentication is implemented again). Note that, in a case where the determination unit 140 determines in Step S1104 that the iris authentication has been appropriately performed (Step S1104/Yes), the processing of the iris authentication is terminated.

(5-3. Operation to Realize Environment for Acquiring Favorable Iris in Advance)

Figure 14:
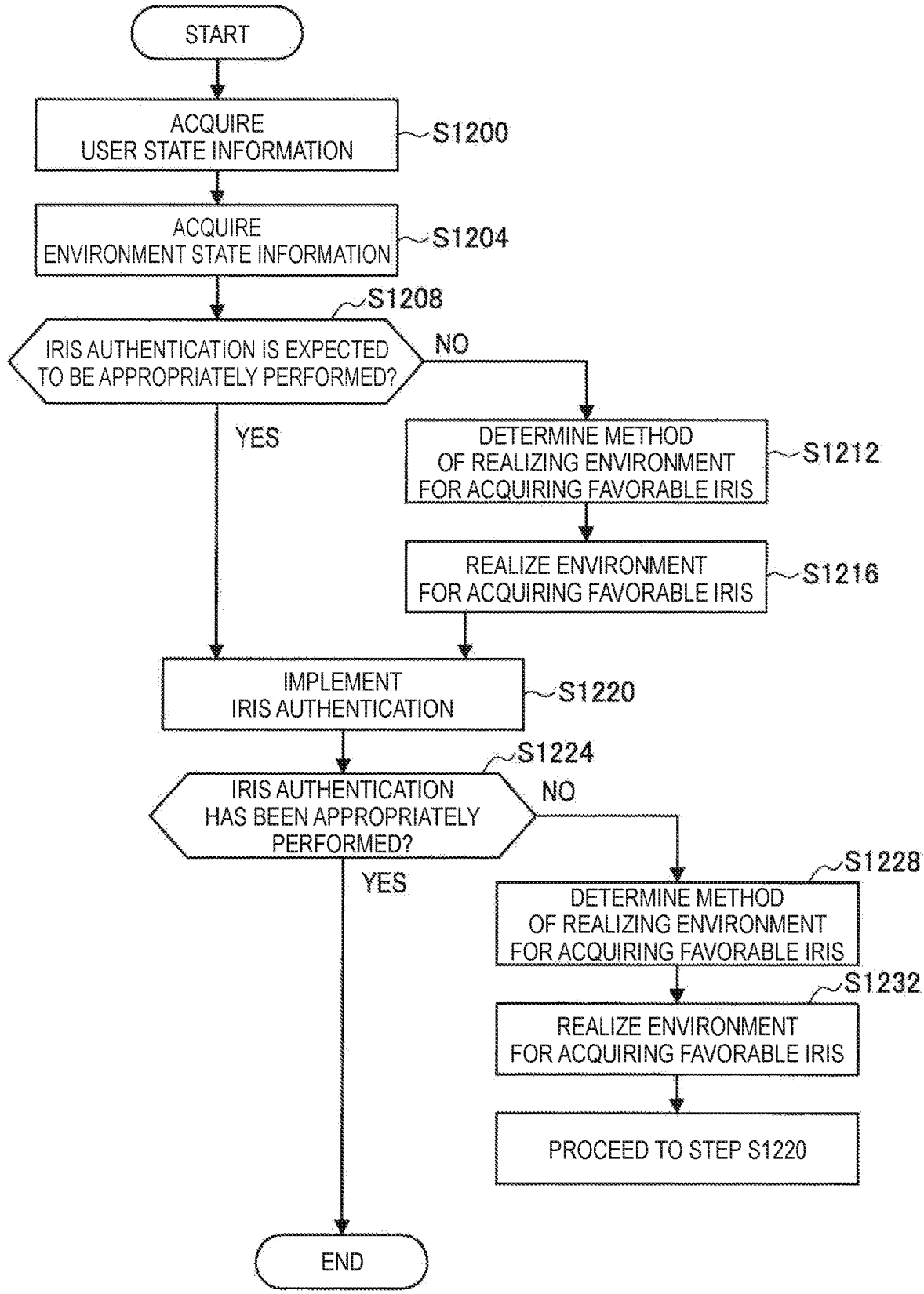
FIG. 14 is a flowchart showing operation to realize an environment for acquiring a favorable iris in advance.

Next, operation to realize an environment for acquiring a favorable iris in advance will be described with reference to FIG. 14. FIG. 14 is a flowchart showing operation to realize an environment for acquiring a favorable iris in advance.

In Step S1200, the user state acquisition unit 121, for example, analyzes a captured image or analyzes sensing data acquired from the own device or an external device and therefore acquires information regarding a state of the user (described as "user state information" in FIG. 14). In Step S1204, the environment state acquisition unit 122 acquires information regarding a state of a surrounding environment of the user (described as "environment state information" in FIG. 14) by a method similar to that of the user state acquisition unit 121.

Then, in Step S1208, the determination unit 140 calculates a possibility that iris authentication is appropriately performed (i.e., a favorable iris is acquired) on the basis of the information regarding a state of the user or the information regarding a state of a surrounding environment of the user. In a case where the determination unit 140 determines that there is a low possibility that iris authentication is appropriately performed (Step S1208/No), the determination unit 140 determines a method of realizing an environment for acquiring a favorable iris in Step S1212.

In Step S1216, the control unit 150 controls each functional configuration on the basis of the method determined by the determination unit 140 and therefore realizes an environment for acquiring a favorable iris. Thereafter, in Step S1220, the authentication unit 130 implements iris authentication. Note that, in a case where the determination unit 140 determines in Step S1208 that there is a high possibility that iris authentication is appropriately performed (Step S1208/Yes), the processing proceeds to Step S1220 and the authentication unit 130 also implements iris authentication. Subsequent operation is similar to operation in and subsequent to Step S 1104 in FIG, 13, and therefore description thereof is omitted.

<6. Hardware Configuration>

Hereinabove, an embodiment of the present disclosure has been described. The above information processing, such as realization of an environment for acquiring a favorable iris and iris authentication, is realized by cooperation of software and hardware of the smartphone 100 or the eyeglass-type terminal 200 described below.

Figure 15:
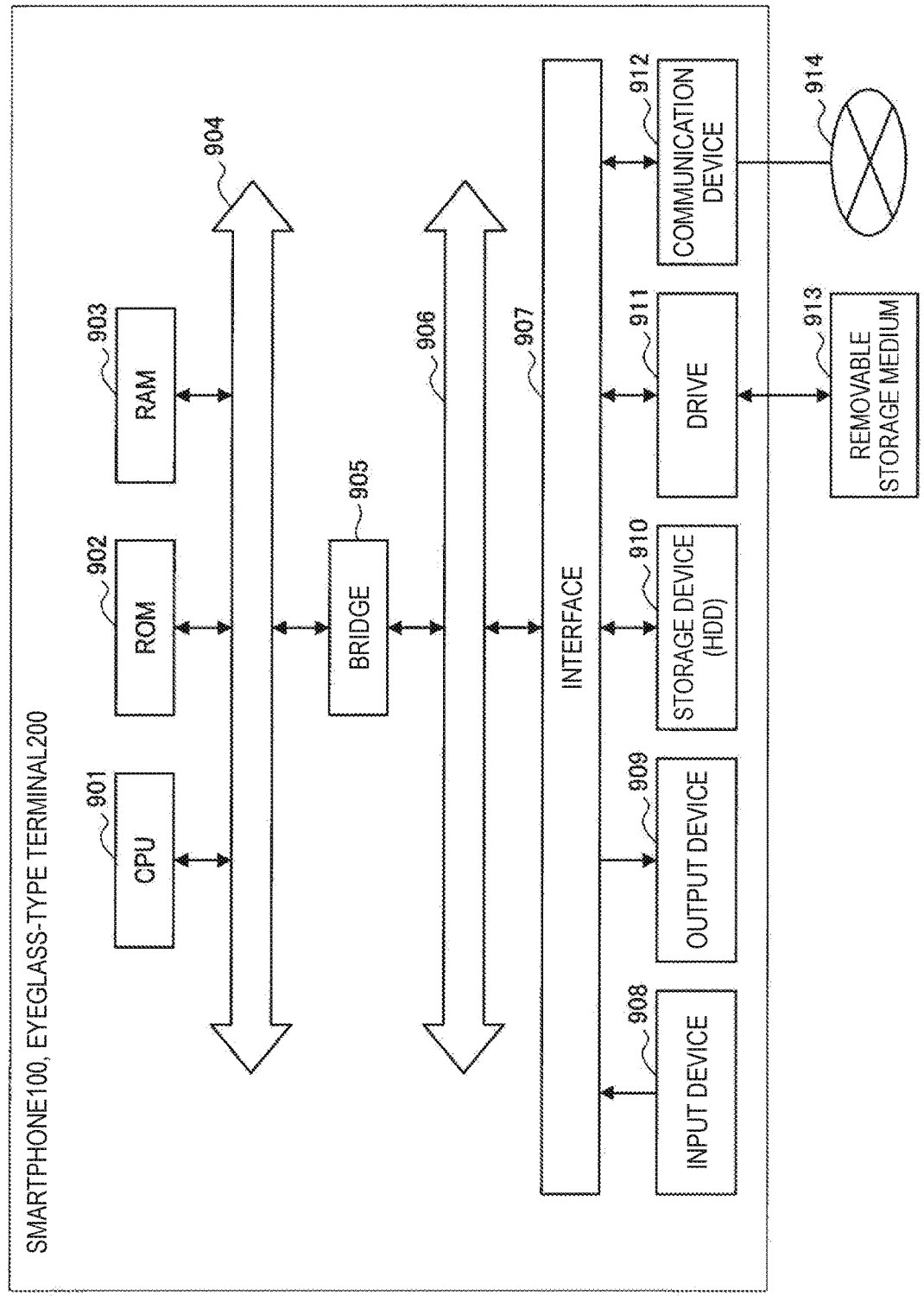
FIG. 15 is a diagram illustrating hardware configurations of a smartphone and eyeglass-type terminal according to an embodiment of the present disclosure.

FIG. 15 is a diagram illustrating hardware configurations of the smartphone 100 and the eyeglass-type terminal 200 according to the embodiment of the present disclosure. FIG. 15 illustrates an information processing apparatus 900 that realizes the smartphone 100 and the eyeglass-type terminal 200. The information processing apparatus 900 includes a central processing unit (CPU) 901, a read only memory (ROM) 902, a random access memory (RAM) 903, and a host bus 904. Further, the information processing apparatus 900 includes a bridge 905, an external bus 906, an interface 907, an input device 908, an output device 909, a storage device (HDD) 910, a drive 911, and a communication device 912.

The CPU 901 functions as an arithmetic processing unit and a control device and controls the whole operation in the information processing apparatus 900 in accordance with various kinds of programs. Further, the CPU 901 may be a microprocessor. The ROM 902 stores programs, operation parameters, and the like that are used by the CPU 901. The RAM 903 temporarily stores programs used in execution of the CPU 901, parameters appropriately changed in the execution, and the like. Those members are connected to one another by the host bus 904 made up of a CPU bus or the like. Functions of the acquisition unit 120, the authentication unit 130, the determination unit 140, the control unit 150, and the display control unit 160 of the smartphone 100 can be realized by cooperation of the CPU 901, the ROM 902, and the RAM 903 (the same applies to the acquisition unit 220 and the like of the eyeglass-type terminal 200).

The host bus 904 is connected to the external bus 906 such as a peripheral component interconnect/interface (PCI) bus via the bridge 905. Note that the host bus 904, the bridge 905, and the external bus 906 do not have to be separately configured, and a single bus may have those functions.

The input device 908 is made up of an input mechanism for allowing the user to input information such as a touchscreen, a button, a microphone, or a switch, an input control circuit for generating an input signal on the basis of input by the user and outputting the input signal to the CPU 901, and the like. By operating the input device 908, the user of the information processing apparatus 900 can input various kinds of data to the information processing apparatus 900 and instruct the information processing apparatus 900 to perform processing operation.

The output device 909 includes, for example, a display device such as a cathode ray tube (CRT) display device, a liquid crystal display (LCD) device, an organic light emitting diode (OLED) device, and a lamp. Further, the output device 909 includes an audio output device such as a speaker and headphones. The output device 909 outputs, for example, reproduced content. Specifically, the display device displays various kinds of information such as reproduced video data in the form of text or image. Meanwhile, the audio output device converts reproduced audio data or the like into audio and outputs the audio.

The storage device 910 is a device for storing data. The storage device 910 may include a storage medium, a recording device for recording data on the storage medium, a reading device for reading data from the storage medium, a deletion device for deleting data recorded on the storage medium, and the like. The storage device 910 is made up of, for example, a hard disk drive (HDD). This storage device 910 drives a hard disk and stores programs executed by the CPU 901 and various kinds of data.

The drive 911 is a reader/writer for a storage medium and is externally attached to the information processing apparatus 900. The drive 911 reads information recorded on a removable storage medium 913 such as a magnetic disc, an optical disc, a magneto-optical disc, or a semiconductor memory mounted thereon and outputs the information to the RAM 903. Further, the drive 911 can also write information in the removable storage medium 913.

The communication device 912 is, for example, a communication interface made up of a communication device or the like to be connected to a communication network 914. A function of the communication unit 170 of the smartphone 100 can be realized by the communication device 912 (the same applies to a communication unit 270 of the eyeglass-type terminal 200).

<7. Remarks>

Note that a machine teaming technology may be used for the present disclosure. More specifically, in the above description, processing such as acquisition of an iris, iris authentication, analysis of a cause in a case where iris authentication fails, and determination of a method of realizing an environment for acquiring a favorable iris is performed by the acquisition unit 120, the authentication unit 130, the determination unit 140, and the like. However, the above series of processing may be realized by machine learning.

For example, a plurality of captured images of an eye are input to a predetermined program in advance, and the program is caused to leant a user corresponding to an iris included in each captured image, a pattern of a favorable iris, a pattern of an unfavorable iris, a pattern of a cause why an unfavorable iris is acquired, a pattern of a method of removing the cause, and the like. Then, in a case where a captured image of an eye is input to the program, the device according to the embodiment of the present disclosure can realize the series of processing such as acquisition of an iris, iris authentication, analysis of a cause in a case where iris authentication fails, and determination of a method of realizing an environment for acquiring a favorable iris.

The device according to the embodiment of the present disclosure can improve accuracy of each processing by using the machine learning technology. Herein, only a part of the series of processing may be learned, instead of all the series of processing described above. Further, by distinctively teaming a characteristic inherent to a user and a characteristic common to all users, the device according to the embodiment of the present disclosure can update an algorithm for use in processing to an algorithm more suitable for each user. The device according to the embodiment of the present disclosure may, for example, upload the updated algorithm to a server on the Internet to distribute the algorithm to another device.

<8. Conclusion>

As described above, in a case where the device according to the embodiment of the present disclosure, such as the smartphone 100 or the eyeglass-type terminal 200, determines that a favorable iris has not been acquired (i.e., iris authentication has not been appropriately performed), the device prompts the user to perform predetermined behavior or controls the own device or an external device in order to realize an acquisition environment for acquiring a favorable iris and can therefore realize an environment for acquiring a favorable iris. Further, the device according to the embodiment of the present disclosure can also perform processing for determining whether or not a favorable iris is acquired and realizing an acquisition environment for acquiring a favorable iris not only after iris authentication fails but also in advance.

With this, the device according to the embodiment of the present disclosure can realize an environment for acquiring a favorable iris more smoothly, as compared to a device that provides only a notification of a cause of a failure of authentication, and can appropriately perform iris authentication and can therefore improve a desire of the user to use iris authentication.

It should be understood by those skilled in the art that various modifications, combinations, sub-combinations and alterations may occur depending on design requirements and other factors insofar as they are within the scope of the appended claims or the equivalents thereof.

For example, the steps shown in each of the above flowcharts do not have to be processed in time series in the order shown in the flowcharts. That is, the steps may be processed in order different from the order shown in the flowcharts or may be processed in parallel. For example, Step S1200 (acquisition of information regarding a state of the user) and Step S1204 (acquisition of information regarding a state of a surrounding environment of the user) in FIG. 14 may be processed in different order or may be processed in parallel.

Further, a part of the configuration of the smartphone 100 can be appropriately provided outside the smartphone 100. Further, a part of the functions of the smartphone 100 may be realized by the control unit 150. For example, the control unit 150 may realize a part of the functions of the image capturing unit 110, the acquisition unit 120, the authentication unit 130, the determination unit 140, the display control unit 160, and the communication unit 170. Further, a part of the configuration of the eyeglass-type terminal 200, as well as that of the smartphone 100, can be appropriately provided outside the eyeglass-type terminal 200. Further, a part of the functions of the eyeglass-type terminal 200 may be realized by a control unit 250.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An electronic device including:
  a determination unit configured to determine, on a basis of information. regarding an environment for acquiring biological information for use in biometric authentication regarding an eye, a method of realizing an environment for acquiring biological information suitable for the biometric authentication; and
  a control unit configured to perform control corresponding to the method.

(2) The electronic device according to (1), in which
  the control unit performs control of the own device or an external device.

(3) electronic device according to (2), in which
  the control unit performs control to prompt a target user of the biometric authentication to perform a predetermined action.

(4) The electronic device according to any one of (1) to (3), in which
  the determination unit determines the method on a basis of information regarding a state of a target user of the biometric authentication, as the information regarding an environment for acquiring biological information.

(5) The electronic device according to (4), in which
  the information regarding a state of the target user indicates at least one of information regarding a degree of opening of the eye, information regarding a line of sight of the target user, information regarding a body part of the target user, information regarding a place in which the target user is located, information regarding a movement of the target user, information regarding transportation used by the target user, information regarding an awake state, a state of excitement, or a state of fatigue of the target user, and information regarding a contact lens worn by the target user.

(6) The electronic device according to any one of (1) to (3), in which
  the determination unit determines the method on a basis of information regarding a state of a surrounding environment of a target user of the biometric authentication as the information regarding an environment for acquiring biological information.

(7) The electronic device according to (6), in which
  the information regarding a state of a surrounding environment of the target user indicates at least one of weather information of a place in which the target user is located, geographical information of a place in which the target user is located, information regarding brightness in surroundings of the target user, information regarding a radiation direction of light, and information regarding an object existing around the target user.

(8) The electronic device according to any one of (1) to (7), in which
  the determination unit determines the method in a case where the determination unit determines that the biometric authentication has failed because biological information not suitable for the biometric authentication has been used or in a case where, before the biometric authentication is performed, the determination unit determines that biological information not suitable for the biometric authentication is to be used.

(9) The electronic device according to any one of (1) to (8), further including
  an authentication unit configured to perform the biometric authentication on a basis of a captured image in which an image of the eye is captured.

(10) The electronic device according to any one of (1) to (9), in which
  the biometric authentication is iris authentication.

(11) The electronic device according to any one of (1) to (10), in which
  the electronic device is a smartphone or an eyeglass-type wearable terminal.

(12) An information processing method that is executed by a computer, the information processing method including:
  determining, on a basis of information regarding an environment for acquiring biological information for use in biometric authentication regarding an eye, a method of realizing an environment for acquiring biological information suitable for the biometric authentication: and
  performing control corresponding to the method.

(13) A program for causing a computer to realize
  determining, on a basis of information regarding an environment for acquiring biological information for use in biometric authentication regarding an eye, a method of realizing an environment for acquiring biological information suitable for the biometric authentication, and
  performing control corresponding to the method.

What is claimed is:
1. An electronic device comprising:
  a determination unit configured to:
    determine whether acquired biological information regarding an eye of a target user is unsuitable for biometric authentication; and
    determine, on a basis of information regarding a state of the target user or a state of a surrounding environment of the target user,
    (i) a cause of the unsuitability and
    (ii) a method by which the target user may perform predetermined steps in order to correct the cause of the unsuitability and thus realize an environment for acquiring additional biological information that is suitable for the biometric authentication when the acquired biological information is unsuitable for biometric authentication; and
  a control unit configured to inform the target user of the cause of the unsuitability, prompt the target user to perform the predetermined steps, and perform control corresponding to the method,
  wherein the determination unit and the control unit are each implemented via at least one processor, wherein the cause of the unsuitability is at least one selected from the group consisting of direct sunlight, an eye not being open, movement of the target user, movement of an image capturing device, obstruction, shifting of a contact lens, and color of a contact lens.

2. The electronic device according to claim 1, wherein the control unit performs control of the electronic device or an external device.

3. The electronic device according to claim 1, wherein the determination unit determines the method on the basis of information regarding the state of the target user.

4. The electronic device according to claim 3, wherein the information regarding the state of the target user includes at least one of information regarding a degree of opening of the eye, information regarding a line of sight of the target user, information regarding a body part of the target user, information regarding a place in which the target user is located, information regarding a movement of the target user, information regarding transportation used by the target user, information regarding an awake state, a state of excitement, or a state of fatigue of the target user, or information regarding a contact lens worn by the target user.

5. The electronic device according to claim 1, wherein the determination unit determines the method on the basis of information regarding the state of the surrounding environment of the target user.

6. The electronic device according to claim 5, wherein the information regarding the state of the surrounding environment of the target user includes at least one of weather information of a place in which the target user is located, geographical information of a place in which the target user is located, information regarding brightness in surroundings of the target user, information regarding a radiation direction of light, or information regarding an object existing around the target user.

7. The electronic device according to claim 1, wherein the determination unit determines whether acquired biological information regarding the eye of a target user is unsuitable for biometric authentication after biometric authentication.

8. The electronic device according to claim 1, further comprising
an authentication unit configured to perform the biometric authentication on a basis of a captured image in which an image of the eye is captured,
wherein the authentication unit is implemented via at least one processor.

9. The electronic device according to claim 1, wherein the biometric authentication is iris authentication.

10. The electronic device according to claim 1, wherein the electronic device is a smartphone or an eyeglass-type wearable terminal.

11. An information processing method that is executed by a computer, the information processing method comprising:
determining whether acquired biological information regarding an eye of a target user is unsuitable for biometric authentication,
determining, on a basis of information regarding a state of the target user or a state of a surrounding environment of the target user,
(i) a cause of the unsuitability and
(ii) a method by which the target user may perform predetermined steps in order to correct the cause of the unsuitability and thus realize an environment for acquiring additional biological information that is suitable for the biometric authentication when the acquired biological information is unsuitable for biometric authentication; and
informing the target user of the cause of the unsuitability, prompting the target user to perform the predetermined steps, and performing control corresponding to the method,
wherein the cause of the unsuitability is at least one selected from the group consisting of direct sunlight, an eye not being open, movement of the target user, movement of an image capturing device, obstruction, shifting of a contact lens, and color of a contact lens.

12. A non-transitory computer-readable medium having embodied thereon a program, which when executed by a computer causes the computer to execute a method, the method comprising:
determining whether acquired biological information regarding an eye of a target user is unsuitable for biometric authentication;
determining, on a basis of information regarding a state of the target user or a state of a surrounding environment of the target user,
(i) a cause of the unsuitability and
(ii) a method by which the target user may perform predetermined steps in order to correct the cause of the unsuitability and thus realize an environment for acquiring additional biological information that is suitable for the biometric authentication when the acquired biological is unsuitable for biometric authentication, and
informing the target user of the cause of the unsuitability, prompting the target user to perform the predetermined steps, and performing control corresponding to the method,
wherein the cause of the unsuitability is at least one selected from the group consisting of direct sunlight, an eye not being open, movement of the target user, movement of an image capturing device, obstruction, shifting of a contact lens, and color of a contact lens.

13. The electronic device according to claim 1, wherein the determination unit determines, prior to biometric authentication, whether acquired biological information regarding the eye of the target user is unsuitable for biometric authentication.

14. The electronic device according to claim 4, wherein the information regarding the state of the target user includes a degree of opening of the eye.

15. The electronic device according to claim 4, wherein the information regarding the state of the target user includes information regarding a movement of the target user.

16. The electronic device according to claim 4, wherein the information regarding the state of the target user includes information regarding transportation used by the target user.

17. The electronic device according to claim 4, wherein the information regarding the state of the target user includes information regarding a contact lens worn by the target user.

18. The electronic device according to claim 6, wherein the information regarding the state of the surrounding environment of the target user includes weather information of a place in which the target user is located.

19. The electronic device according to claim 6, wherein the information regarding the state of the surrounding environment of the target user includes information regarding brightness in surroundings of the target user.

20. The electronic device according to claim 1, wherein the cause of the unsuitability is at least one selected from the group consisting of shifting of a contact lens and color of a contact lens.

* * * * *